United States Patent
Chu

(10) Patent No.: US 12,080,231 B2
(45) Date of Patent: Sep. 3, 2024

(54) DISPLAYING METHOD OF DISPLAY PANEL AND DISPLAY DEVICE

(71) Applicant: BOE Technology Group Co., Ltd., Beijing (CN)

(72) Inventor: Mingi Chu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/789,617

(22) PCT Filed: Aug. 18, 2021

(86) PCT No.: PCT/CN2021/113204
§ 371 (c)(1),
(2) Date: Jun. 28, 2022

(87) PCT Pub. No.: WO2022/048442
PCT Pub. Date: Mar. 10, 2022

(65) Prior Publication Data
US 2023/0230542 A1 Jul. 20, 2023

(30) Foreign Application Priority Data
Sep. 4, 2020 (CN) .......................... 202010922460.5

(51) Int. Cl.
G09G 3/3225 (2016.01)
G09G 3/3208 (2016.01)

(52) U.S. Cl.
CPC ... *G09G 3/3225* (2013.01); *G09G 2300/0842* (2013.01); *G09G 2320/0233* (2013.01);
(Continued)

(58) Field of Classification Search
CPC .................. G09G 2360/145; G09G 2360/14
See application file for complete search history.

(56) References Cited

U.S. PATENT DOCUMENTS

| | | | |
|---|---|---|---|
| 7,136,056 B2* | 11/2006 | Lee | G09G 3/006 |
| | | | 348/E17.005 |
| 8,836,797 B1* | 9/2014 | Rykowski | G09G 3/20 |
| | | | 345/589 |

(Continued)

FOREIGN PATENT DOCUMENTS

| | | |
|---|---|---|
| CN | 102141435 A | 8/2011 |
| CN | 102915702 A | 2/2013 |

(Continued)

OTHER PUBLICATIONS

First Office Action issued on Apr. 30, 2021 for application No. CN202010922460.5 with English translation attached.

*Primary Examiner* — Sepehr Azari
(74) *Attorney, Agent, or Firm* — Nath, Goldberg & Meyer; Joshua B. Goldberg

(57) ABSTRACT

A display method and a display device of a display panel are provided, and belongs to the field of display technology. The display panel of the disclosure includes a light emitting device and a light sensing device. Each light sensing device is used for sensing the light emitted by at least one light emitting device. The display data of each light emitting device in the display panel is obtained according to a target brightness value and a brightness compensation gain value. The method includes: in a sensing stage, obtaining an actual brightness value of the light emitting device to be compensated according to the sensing data generated by the light sensing device, and setting a brightness compensation gain of the light emitting device to be compensated according to at least the obtained actual brightness value and the target brightness value.

13 Claims, 6 Drawing Sheets

(52) U.S. Cl.
CPC .............. *G09G 2320/0626* (2013.01); *G09G 2360/142* (2013.01)

(56) References Cited

U.S. PATENT DOCUMENTS

| | | | | |
|---|---|---|---|---|
| 2003/0063081 | A1* | 4/2003 | Kimura | G09G 3/3233 345/211 |
| 2003/0214586 | A1* | 11/2003 | Lee | H04N 17/04 348/E17.005 |
| 2005/0285822 | A1* | 12/2005 | Reddy | H10K 59/13 345/76 |
| 2006/0256048 | A1* | 11/2006 | Fish | G09G 3/3233 345/81 |
| 2007/0290957 | A1* | 12/2007 | Cok | G09G 3/3225 345/77 |
| 2008/0252629 | A1* | 10/2008 | Chiang | G09G 3/20 345/207 |
| 2011/0063341 | A1* | 3/2011 | Knicely | G09G 3/006 345/102 |
| 2012/0026315 | A1* | 2/2012 | Lee | G09G 3/006 348/125 |
| 2012/0074851 | A1* | 3/2012 | Erinjippurath | G09G 3/20 315/158 |
| 2016/0300527 | A1 | 10/2016 | Piper et al. | |
| 2018/0332261 | A1* | 11/2018 | Zhang | H04N 1/6044 |
| 2018/0342224 | A1* | 11/2018 | Beon | G06T 5/009 |

FOREIGN PATENT DOCUMENTS

| | | |
|---|---|---|
| CN | 103383282 A | 11/2013 |
| CN | 104464629 A | 3/2015 |
| CN | 105825797 A | 8/2016 |
| CN | 106531081 A | 3/2017 |
| CN | 107464529 A | 12/2017 |
| CN | 108376532 A | 8/2018 |
| CN | 108428721 A | 8/2018 |
| CN | 108694906 A | 10/2018 |
| CN | 108917921 A | 11/2018 |
| CN | 108962135 A | 12/2018 |
| CN | 109147657 A | 1/2019 |
| CN | 109584797 A | 4/2019 |
| CN | 109920363 A | 6/2019 |
| CN | 110767162 A | 2/2020 |
| CN | 110767722 A | 2/2020 |
| CN | 112071263 A | 12/2020 |

* cited by examiner

DISPLAYING METHOD OF DISPLAY PANEL AND DISPLAY DEVICE

This is a National Phase Application filed under 35 U.S.C. 371 as a national stage of PCT/CN2021/113204, filed Aug. 18, 2021, an application claiming the benefit of Chinese Patent Application No. 202010922460.5, filed Sep. 4, 2020, the content of each of which is hereby incorporated by reference in its entirety.

TECHNICAL FIELD

The disclosure relates to the field of display technology, and particularly relates to a display method of a display panel and a display device.

BACKGROUND

An Organic Light-Emitting Device (OLED) is a light emitting device using an organic solid semiconductor as a light emitting material, and has the advantages of simple manufacturing process, low cost, low power consumption, high luminance, wide working temperature application range, and the like, so that the OLED has a wide application prospect.

SUMMARY

The present disclosure is directed to at least one of the technical problems existing in the prior art, and provides a display method and a display device of a display panel.

The technical solution adopted for solving the technical problem is a display method of a display panel, wherein the display panel includes light emitting devices and light sensing devices, each of light sensing devices being used for sensing light emitted by at least one of the light emitting devices, and a display data of each light emitting device in the display panel being obtained according to a target brightness value and a brightness compensation gain value, the method including:
  in a sensing stage, obtaining, according to sensing data generated by the light sensing devices, an actual brightness value of a light emitting device to be compensated, and setting, according to at least the obtained actual brightness value and the target brightness value, a brightness compensation gain of the light emitting device to be compensated.

In some embodiments, obtaining the actual brightness value of the light emitting device to be compensated according to the sensing data generated by the light sensing devices, and setting the brightness compensation gain of the light emitting device to be compensated according to at least the obtained actual brightness value and the target brightness value, includes:
  obtaining the actual brightness value of the light emitting device to be compensated for display of at least one frame of image every predetermined period, and setting the brightness compensation gain of the light emitting device to be compensated according to the obtained actual brightness value and the target brightness value.

In some embodiments, the obtaining the actual brightness value of the light emitting device to be compensated for the display of the at least one frame of image every predetermined period, and the setting the brightness compensation gain of the light emitting device to be compensated according to the obtained actual brightness value and the target brightness value, includes:
  obtaining, every predetermined period, a plurality of actual brightness values of the light emitting device to be compensated for a plurality of frames of images that are continuously displayed;
  comparing an average value of the plurality of actual brightness values with an average value of a plurality of target brightness values corresponding to the plurality of actual brightness values; and
  setting the brightness compensation gain of the light emitting device to be compensated according to a result of the comparing.

In some embodiments, before the obtaining the actual luminance value of the light emitting device to be compensated based on the sensing data generated by the light sensing devices and setting the brightness compensation gain of the light emitting device to be compensated according to at least the obtained actual luminance value and the target luminance value, the method further includes:
  determining the light emitting device to be compensated according to the target brightness value of each light emitting device for a plurality of frames of images displayed within a predetermined period of time.

In some embodiments, the determining the light emitting device to be compensated according to the target luminance value of each light emitting devices for the plurality of frames of images displayed within the predetermined period of time, includes:
  determining a light emitting device whose target brightness value for the plurality of frames of images displayed in the predetermined period of time meets a predetermined standard among the light emitting devices as the light emitting device to be compensated;
  the predetermined standard includes at least one of:
  the target brightness values for the plurality of frames of images displayed in the predetermined period of time all exceed a predetermined value;
  among the plurality of frames of images displayed within the predetermined period of time, a ratio of frames of images for which the target brightness values exceeds the predetermined value is greater than a predetermined ratio; and
  an average value of the target luminance values of the plurality of frames of images displayed within the predetermined period of time exceeds the predetermined value.

In some embodiments, the display panel is divided into a plurality of test regions, the determining the light emitting device to be compensated according to the target brightness value of each light emitting device for the plurality of frames of images within the predetermined period of time includes:
  determining a test region to be compensated according to the target brightness value of each light emitting device for the plurality of frames of images displayed within the predetermined period of time; and
  determining each light emitting device in the test region to be compensated as the light emitting device to be compensated.

In some embodiments, the method further includes:
  in a startup stage, controlling the display panel to display a test image, and determining the brightness compensation gain of each light emitting device according to the sensing data generated by the light sensing devices.

In some embodiments, the controlling the display panel to display the test image includes:
  inputting a same test data to each light emitting device in the display panel to control the display panel to display the test image; or inputting a same test data to a part of light emitting devices in the display panel to control the display panel to display the test image.

In some embodiments, the part of light emitting devices to which the same test data is input are arranged every other row or column.

In some embodiments, the setting the brightness compensation gain of the light emitting device to be compensated according to the obtained actual luminance value and the target luminance value includes:

comparing the actual brightness value of the light emitting device to be compensated with the target brightness value; and determining whether the brightness compensation gain of the light emitting device to be compensated needs to be adjusted; and adjusting the brightness compensation gain according to a correspondence relation between a brightness value range and the brightness compensation gain adjustment range when it is determined that the brightness compensation gain of the light emitting device to be compensated needs to be adjusted.

In some embodiments, the method further includes:

in a light sensing device calibration stage, irradiating the light sensing device by a test light source, and obtaining a sensing calibration gain of the light sensing device according to the sensing data generated by the light sensing devices.

In some embodiments, the irradiating the light sensing device by the test light source and obtaining the sensing calibration gain of the light sensing device according to the sensing data generated by the light sensing device includes:

inputting the same test data to each light emitting device in the display panel;

obtaining a brightness value of each light emitting device in the display panel through a brightness acquisition element;

compensating the light emitting devices according to the obtained result, and using the compensated display panel as the test light source; and irradiating the light sensing device by the test light source, and obtaining the sensing calibration gain of the light sensing device according to the sensing data generated by the light sensing device.

In some embodiments, irradiating the light sensing device by the test light source and obtaining the sensing calibration gain of the light sensing device according to the sensing data generated by the light sensing device includes:

irradiating the light sensing device by using an optical integrating sphere or a backlight light source as the test light source; and obtaining the sensing calibration gain of the light sensing device according to the sensing data generated by the light sensing device.

In some embodiments, the obtaining the sensing calibration gain of the light sensing device according to the sensing data generated by the light sensing device includes:

obtaining sensing calibration comparison parameters, and determining a ratio of the sensing data of each light sensing device to the sensing calibration comparison parameters as the sensing calibration gain of each light sensing device, wherein the sensing calibration comparison parameter is obtained by any one of:

determining an average value of the sensing data of all the light sensing devices as the sensing calibration comparison parameter;

determining a maximum value of the sensing data of all the light sensing devices as the sensing calibration comparison parameter; and setting the sensing calibration comparison parameter according to a brightness value of the test light source.

In a second aspect, an embodiment of the present disclosure further provides a display device, which includes:

a display panel including a plurality of pixel units and a plurality of sensing units, each of the plurality of pixel units including a pixel driving circuit and a light emitting device, each of the plurality of sensing units including a sensing circuit including a light sensing device, and each of light sensing device being used for sensing brightness of at least one light emitting device;

one or more source drivers electrically connected to the plurality of pixel units for providing display data to the plurality of pixel units; and a storage device having one or more programs stored thereon, when the one or more programs are executed by the one or more source drivers, the one or more source drivers implementing the display method described above.

DETAIL DESCRIPTION

Figure 1:
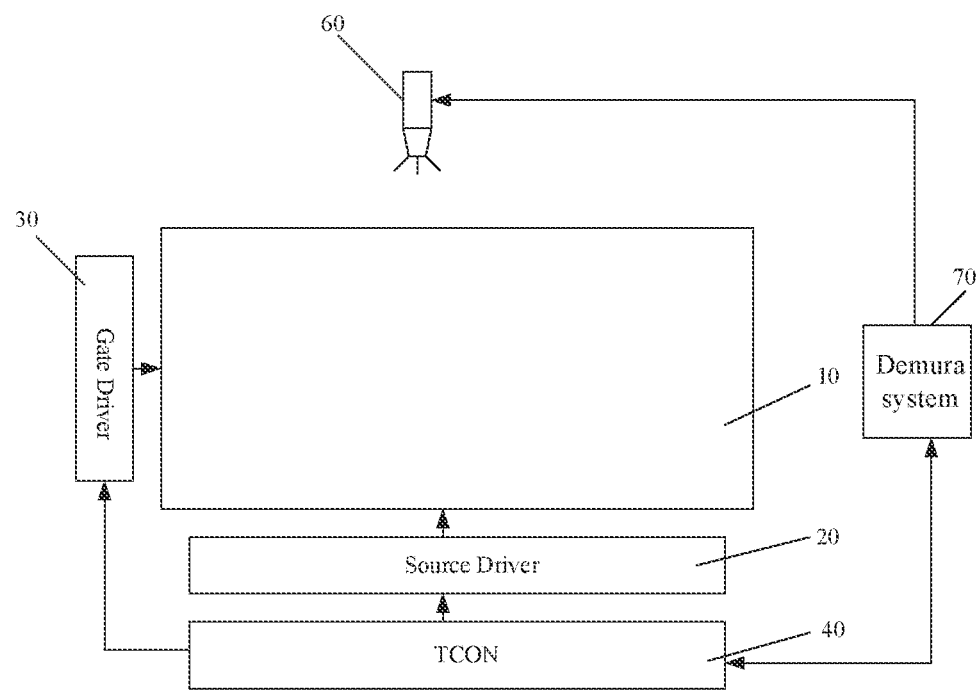
FIG. 1 is a schematic diagram of an exemplary optical compensation system.

In order to make those skilled in the art better understand the technical solutions of the embodiments of the present disclosure, the present disclosure is described in further detail below with reference to the accompanying drawings and the detailed description.

Unless otherwise defined, all terms (including technical and scientific terms) used herein have the same meaning as commonly understood by one of ordinary skill in the art to which this disclosure belongs. The use of "first," "second," and the like in this disclosure is not intended to indicate any order, quantity, or importance, but rather is used to distinguish one component from another. Also, the use of the terms "a", "an", or "the" and the like do not denote a limitation of quantity, but rather denote the presence of at least one. The word "including" or "includes", and the like, means that the element or item preceding the word includes the element or item listed after the word and its equivalent, but does not exclude other elements or items. The terms "connected" or "interconnected" and the like are not restricted to physical or mechanical connections, but may include electrical connections, whether direct or indirect, "upper", "lower", "left", "right", and the like are used only to indicate relative positional relationships, and when the absolute position of the object being described is changed, the relative positional relationships may also be changed accordingly.

It should be noted that the transistors used in the embodiments of the present disclosure may be thin film transistors or field effect transistors or other devices with the same characteristics, and since the source and the drain of the transistors used are symmetrical, the source and the drain are of no difference. In the embodiments of the present disclosure, to distinguish the source and the drain of the transistor, one of them is referred to as a first electrode, the other is referred to as a second electrode, and the gate is referred to as a control electrode. In addition, the transistors can be divided into N-type transistors and P-type transistors according to the characteristics of the transistors, and in the following embodiments, the N-type transistors are used for explanation, when the N-type transistors are used, the first electrode is the source electrode of the N-type transistor, the second electrode is the drain electrode of the N-type transistor, and when a high-level is input to the gate electrode, the source electrode and the drain electrode are connected. For a P-type transistor, the opposite case is applied. It is conceivable that implementation with P-type transistors will be readily conceived by those skilled in the art without creative effort and, thus, is also within the scope of the embodiments of the present disclosure.

In the embodiment of the present disclosure, since a case where the transistors used are N-type transistors is taken as an example, the operating level signal in the embodiment of the present disclosure refers to a high-level signal, and the non-operating level signal refers to a low-level signal. The corresponding operating level terminal is a high-level signal terminal, and the non-operating level terminal is a low-level signal terminal. The first power voltage applied to the first power voltage terminal is higher than the second power voltage applied to the second power voltage terminal, and in the embodiment of the present disclosure, a case where the first power voltage is a high power voltage and the second power voltage is a low power voltage is taken as an example.

FIG. 1 is a schematic diagram of an exemplary optical compensation system. As shown in FIG. 1, a display panel 10 is provided with a plurality of pixel units, each of which includes a plurality of sub-pixels each having a light emitting device disposed therein, and light emission luminance of the light emitting devices of the display panel is obtained by an optical lens (CCD) and a brightness measuring instrument (Luminance meter) 60 in the display device. Specifically, when the optical compensation system (Demura system) 70 controls each sub-pixel in the display panel 10 for corresponding display, the display data for each sub-pixel is transmitted to a timing controller (TCON) 40. The timing controller 40 converts the display data into a voltage signal and outputs the voltage signal to the source driver 20, so as to control each light emitting device in the display panel to perform gray scale display. After the display is completed, the optical compensation system 70 controls the optical lens (CCD) and the brightness measuring instrument (Luminance meter) 60 to obtain the light emission luminance of the light emitting devices of the display panel and perform data operation, and then the compensation data or parameter is stored in the memory for subsequent optical compensation and display. It is found by the inventor that the deterioration (degradation) phenomenon of the light emitting devices and other elements in the display panel 10 cannot be sensed in real time because the optical compensation is calibrated by using the optical system, and with the increase of the display time of the display panel 10, the optical compensation effect will gradually become less obvious, and thus the compensation effect cannot achieved.

Accordingly, the embodiments of the present disclosure provide, inter alia, following technical solutions.

Figure 2:
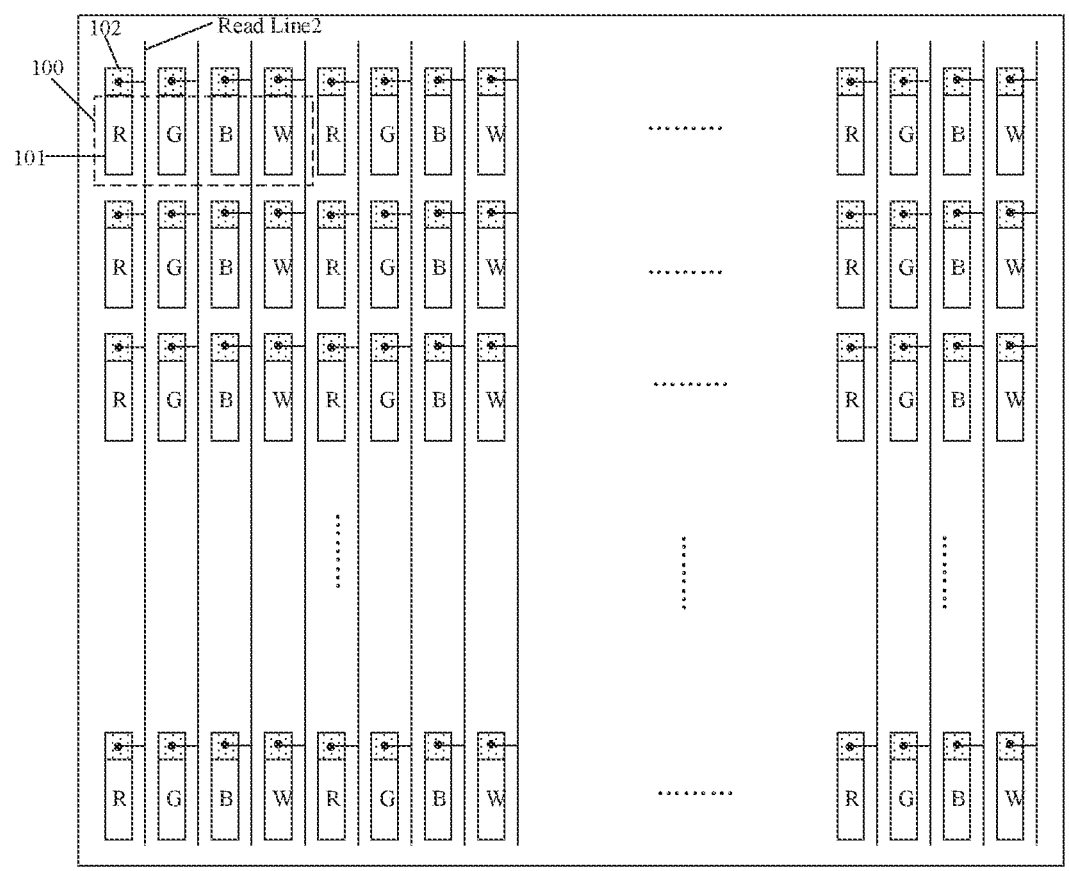
FIG. 2 is a top view of a structure of a display panel according to an embodiment of the disclosure.

FIG. 2 is a top view of a structure of a display panel according to an embodiment of the disclosure. As shown in FIG. 2, the display panel includes pixel units 100 arranged in an array and each including a plurality of sub-pixels 101, and a plurality of light sensing units 102 arranged in an array on the light emitting side of the pixel unit 100, among which the light sensing units 102 in the same column are connected to the same second read line Read Line2. The sub-pixels 101 and the sensing units 102 may be arranged in a one-to-one correspondence manner, or may be arranged in a manner in which multiple sub-pixels 101 correspond to one sensing unit 102 and different sensing units 102 correspond to different sub-pixel units 101. For example, each pixel unit includes a red sub-pixel R, a green sub-pixel G, a blue sub-pixel B and a white sub-pixel W, and the pixel units 100 and the sensing units 102 are arranged in one-to-one correspondence, that is, one sensing unit corresponds to four sub-pixels (i.e., red, green, blue and white ones) in one pixel unit.

Figure 3:
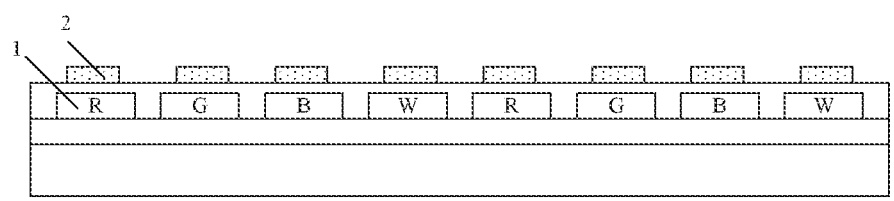
FIG. 3 is a schematic structural diagram of a display panel.
Figure 4:
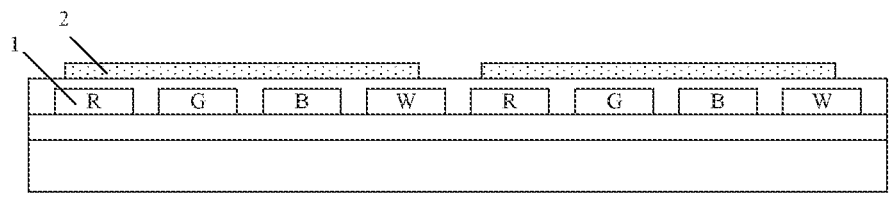
FIG. 4 is a schematic structural diagram of another display panel.

It should be understood that a light emitting device 1 is disposed in each sub-pixel 101, and a light sensing device 2 is disposed in each sensing unit 102. If the sub-pixels 101 and the light sensing units 102 are arranged in one-to-one correspondence, the light emitting devices 1 and the light sensing devices 2 are arranged in one-to-one correspondence, as shown in FIG. 3. If multiple sub-pixels 101 correspond to one sensing unit 102, multiple light emitting devices 1 correspond to one light sensing device 2. For example, the light emitting devices 1 of four sub-pixels of red, green, blue and white in each pixel unit 100 correspond to one light sensing device 2, as shown in FIG. 4.

Each sub-pixel 101 includes a pixel drive circuit and a light emitting device 1 connected to the pixel drive circuit. Each sensing unit 102 includes a sensing circuit, and each sensing circuit includes at least a light sensing device. The light sensing device in the sensing circuit is located on the light emitting side of the light emitting device 1 in the pixel circuit to detect the light emission luminance of the light emitting device 1 and compensate the light emission luminance of the light emitting device 1 according to the sensing result of the light sensing device 2.

It should be noted that, in order to avoid the light sensing device 2 from affecting the light output of the light emitting device 1, the light sensing device 2 used in the embodiment of the present disclosure is a transparent device, and specifically may be a photodiode PIN, and the light emitting device 1 in the embodiment of the present disclosure is an organic electroluminescent diode OLED.

In order to make the structure of the display panel according to the embodiments of the present disclosure clearer, the pixel driving circuit and the sensing circuit are illustrated below by way of example.

Figure 5:
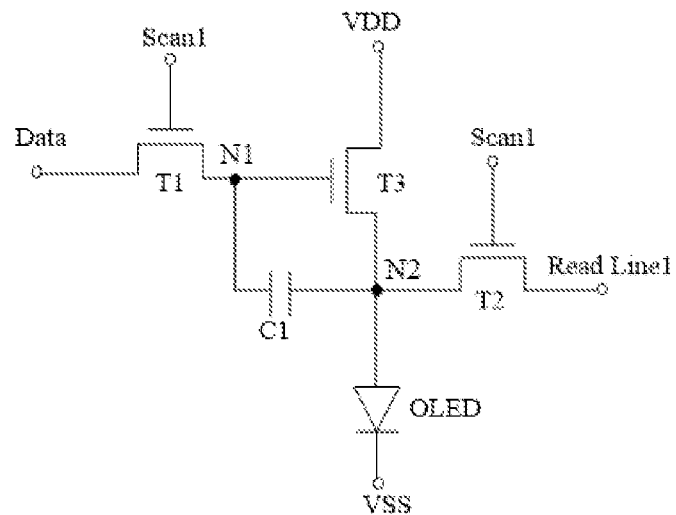
FIG. 5 illustrates an exemplary pixel driving circuit.

FIG. 5 shows an exemplary pixel driving circuit. As shown in FIG. 5, the pixel driving circuit includes a first transistor T1, a second transistor T2, a third transistor T3, and a first storage capacitor C1. A source of the first transistor T1 is connected to the data line Data, a drain of the first transistor T1 is connected to the first node N1, and a gate of the first transistor T1 is connected to the first scan line Scan1. A source of the second transistor T2 is connected to a first read line Read Line1, a drain of the second transistor T2 is connected to a second node N2, and a gate of the second transistor T2 is connected to a first scan Line. A source of the third transistor T3 is connected to the first power supply voltage terminal VDD, a drain of the third transistor T3 is connected to the second node N2, and a gate of the third transistor T3 is connected to the first node N1. A first terminal of the first storage capacitor C1 is connected to the first node N1, and a second terminal of the first storage capacitor C1 is connected to the second node N2. An anode of the organic electroluminescent diode OLED is connected to the second node N2, and a cathode of the organic electroluminescent diode OLED is connected to the second power voltage terminal VSS.

Figure 6:
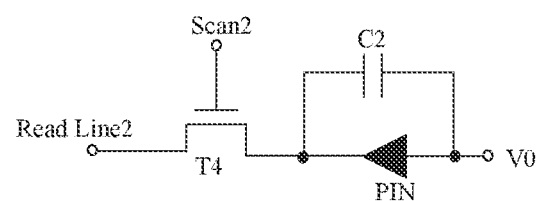
FIG. 6 illustrates an exemplary sensing circuit.

FIG. 6 illustrates an exemplary sensing circuit. As shown in FIG. 6, the sensing circuit includes a fourth transistor T4, a photodiode PIN, a second storage capacitor C2. A source of the fourth transistor T4 is connected to the second read line Read Line Read2, a drain of the fourth transistor T4 is connected to a first electrode of the photodiode PIN, and a gate of the fourth transistor T4 is connected to the second scan line Scan2. A first terminal and a second terminal of the second storage capacitor C2 are connected to the first electrode and the second electrode of the photodiode PIN, respectively, and the second electrode of the photodiode PIN is connected to a reverse bias voltage terminal V0.

In a case where no sensing unit 102 is disposed in the display panel, during a display stage that the display panel enters after being started up, a driving timing of each frame of image includes an active display region and a transition region (blank region). The active display region refers to the time for the gate drive circuit to sequentially output a square wave to the scan line connected with the gate drive circuit, and the transition region refers to the non-operating time of the gate drive circuit after outputting square waves to each scan line. In brief, for example, when the display device displays an image, a transition is generated when the display device switches from a first frame of image to a second frame of image, the time for the transition is the transition region, and the time of scanning one frame of image is the active display region.

When the sensing unit 102 is provided in the display panel according to the embodiment of the present disclosure, after the display panel enters the display stage and performs display for a period of time, for example, 30 hours, the display panel drives the sub-pixels 101 line by line in the transition region for displaying next at least one frame of image, test data is written into each sub-pixel 101, and the light emitting device 1 in each sub-pixel 101 is controlled to emit light according to the test data. Meanwhile, the light sensing device in the sensing unit 102 senses the light emitted by the light emitting device 1 of the sub-pixel 101, and outputs the sensing result, and it is determined according to the sensed result whether the light emitting device 1 is deteriorated. That is, in the embodiment of the present disclosure, the sensing stage of the display panel occurs in the transition region of the scanning timing of at least a frame of image.

In addition, it should be noted that, when the light sensing devices 2 and the light emitting devices 1 are in one-to-one correspondence, the sensing of all the light emitting devices 2 can be completed in one transition region. In a case where one light sensing device 2 corresponds to a plurality of light emitting devices 1, for example, one light sensing device 2 corresponds to four light emitting devices 1 of red, green, blue and white in one pixel unit 100, the sensing of the light emitting device 1 of only one color can be completed in one transition region, and the sensing of all four light emitting devices 1 needs to be completed in the four transition regions, respectively. That is, the display time of four frames of images is needed to complete one sensing of all the light emitting devices 1 in the display panel. Of course, for the accuracy of the sensing results, after the display panel performs display for a certain period of time, the light emission luminance of each light emitting device 1 in the display panel is continuously detected for a plurality of times. It can be understood that, in practice, the sensing principle is the same no matter one light sensing device 2 corresponds to one light emitting device 1 or one light sensing device 2 corresponds to a plurality of light emitting devices 1, only the time of each sensing period is different in both the cases. For the convenience of understanding, in the description of the following embodiments, the description is given by taking the light sensing device 2 and the light emitting device 1 in one-to-one correspondence as an example.

In order to clarify the display method of the display panel according to the embodiment of the present disclosure, the working process of the active display region for displaying one frame of image and the transition region for sensing is described by taking the display panel including the pixel driving circuit and the sensing circuit described above as an example.

In the active display region of the display stage, a high-level signal is written to the first scan line Scan1, the first transistor T1 in the pixel driving circuit is turned on, the data voltage Vdata in the data line Data is written to the first node N1, the first storage capacitor C1 is charged, and the organic electroluminescent diode OLED is driven by the third transistor T3 to emit light. Since the high-level signal is written into the first scan line Scan1, the second transistor T2 in the pixel driving circuit is turned on, and the electrical signal at the drain of the third transistor T3 is read by the second transistor T2 and output through the first read line Read Line1, so that the external compensation circuit compensates the mobility of the third transistor T3 through the output electrical signal.

In the transition region of the display stage (i.e., sensing stage), a high-level signal is written to the first scan line Scan1, the first transistor T1 in the pixel driving circuit is turned on, the test voltage in the data line Data is written to the first node N1, the first storage capacitor C1 is charged, and the organic electroluminescent diode OLED is driven by the third transistor T3 to emit light. During the display stage, the organic electroluminescent diode OLED emits light to irradiate the photodiode PIN, and the photodiode PIN generates a corresponding electrical signal (i.e., charges) according to the light signal sensed by itself, and stores the electrical signal in the second storage capacitor C2. A high-level signal is written into the second scan line Scant, the fourth transistor T4 in the sensing circuit is turned on, an electric signal generated by the photodiode PIN is read through the second read line Read Line2, and it is determined, according to the electric signal read by the second read line Read Line2, whether the light emitting device 1 is deteriorated and whether the light emission luminance needs to be compensated. For example, when the target brightness value corresponding to the test voltage written into the data line is 100, and it is determined according the electrical signal generated from the optical signal sensed by the photodiode PIN that the light emission luminance value of the light emitting device 1 is only 95, it indicates that the light emission luminance of the light emitting device 1 needs to be compensated.

In an embodiment of the present disclosure, in view of the problem that the light emission luminance of the light emitting device 1 in the display panel is decreased, a display method capable of compensating the light emission luminance of the display panel is provided.

In a first aspect, an embodiment of the present disclosure provides a display method of a display panel, the display panel 10 includes, but is not limited to, the display panel described above, that is, the display panel 10 includes light emitting devices 1 and light sensing devices 2 disposed in one-to-one correspondence. The display data written to respective light emitting devices 1 in the active display stage for displaying each frame of image is obtained based on a target luminance value and a brightness compensation gain. An actual luminance value (i.e., the luminance value after being compensated) of each light emitting device 1 is denoted by $GL(i)'$, the target luminance value is denoted by $GL(i)$, the brightness compensation gain is denoted by $CompGain\_ALG1(i)$, and a relation between them is expressed as: $GL(i)'=GL(i) \times CompGain\_ALG1(i)$; and the display data corresponding to the actual brightness value is obtained according to the relation between the brightness value and the display data as above. For example, when the target luminance value $GL(i)=100$ and the brightness compensation gain $CompGain\_ALG1(i)=1.1$ for a certain light emitting device 1, the actual luminance value $GL(i)'$ is $100 \times 1.1=110$, and the display data corresponding to the luminance value of 110 is obtained and used as the to-be-display data for each frame of image.

Figure 7:
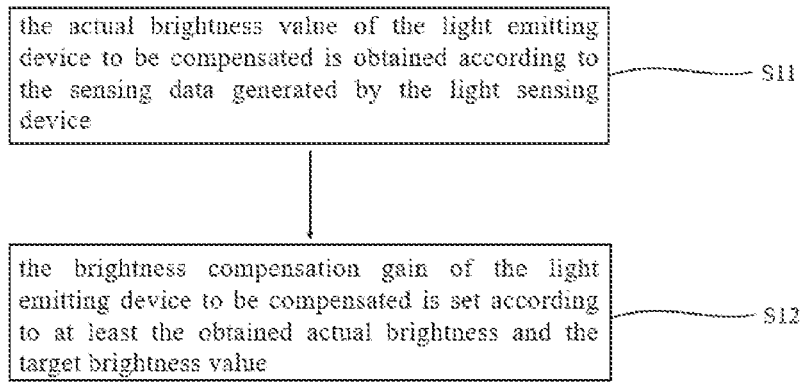
FIG. 7 is a flowchart of a display method of a display panel in a sensing stage according to an embodiment of the disclosure.

FIG. 7 is a flowchart illustrating a display method of a display panel at a sensing stage according to an embodiment of the disclosure; as shown in FIG. 7, a display method according to an embodiment of the present disclosure includes a sensing stage including the following steps S11 and S12.

At step S11, the actual brightness value $GL(i)'$ of the light emitting device to be compensated is determined according to the sensing data generated by the light sensing device 2.

At step S12, the brightness compensation gain $CompGain\_ALG1(i)$ of the light emitting device to be compensated is set according to at least the obtained actual brightness value $GL(i)'$ and the target brightness value $GL(i)$.

Specifically, in the sensing stage, i.e., in the transition region of the display timing of at least one frame of image, the controller writes test data to each light emitting device 1 in the display panel 10 to control the light emitting devices 1 to emit light. At this time, the light sensing device 2 corresponding to each light emitting device 1 senses the light emitted by the light emitting device 1, and generates corresponding electrical signals according to the optical signals, and at this time, the controller can determine the actual brightness value $GL(i)'$ of the light emitting device 1 corresponding to the light sensing device 2 according to the electrical signals generated by the light sensing device 2, the controller compares the actual brightness value $GL(i)'$ of the light emitting device to be compensated in each light emitting device 1 with the target brightness value $GL(i)$ corresponding to the test data thereof, the brightness compensation gain $CompGain\_ALG1(i)$ is set, according to the comparison result, for the display data of each frame of image that is displayed next by the light emitting device 1.

The actual brightness value $GL(i)'$ of the light emitting device to be compensated is obtained from the data sensed by the light sensing device 2, that is, the sensing result of the light sensing device 2 can be used to characterize the actual brightness value $GL(i)'$ of the light emitting device. Meanwhile, since the target brightness value $GL(i)$ is known, when the light emission luminance of the light emitting device 1 is the target brightness value $GL(i)$, the sensing result that the light sensing device 2 can sense is also known. In the embodiment of the present disclosure, the sensing result of the target brightness value corresponding to light sensing device is represented by $SenseTarget(i)$, and the sensing result of the actual brightness value corresponding to the light sensing device is represented by $SenseData'(i)$. At this time, it is determined, according to the error range $DiffRange$ of $SenseData'(i)$ and $SenseTarget(i)$, whether the brightness compensation gain $CompGain\_ALG1(i)$ needs to be adjusted, and the brightness compensation gain $CompGain\_ALG1(i)$ is set by using a table lookup method. The specific adjustment of the brightness compensation gain $CompGain\_ALG1(i)$ is set as follows:

(1) if $SenseData'(i)$ is greater than or equal to $SenseTarget(i)+DiffRange$, the brightness compensation gain $CompGain\_ALG1(i)$ is increased;

(2) if $SenseData'(i)$ is less than $SenseTarget(i)+DiffRange$, the brightness compensation gain $CompGain\_ALG1(i)$ is decreased;

(3) if $SenseData'(i)$ is in the range of $SenseTarget(i) \pm DiffRange$, the brightness compensation gain $CompGain\_ALG1(i)$ is kept unchanged.

It should be noted that, if the sensing period of the sensing stage is a plurality of transition regions, for each transition region, the actual brightness value $GL(i)'$ of the light emitting device to be compensated is compared with the target brightness value $GL(i)$ corresponding to the test data thereof in the above manner. At this time, a plurality of comparison results are generated. If a predetermined number of comparison results or more among the plurality of comparison results indicate that there is a difference between the actual brightness value $GL(i)'$ of the light emitting device to be compensated and the target brightness value $GL(i)$, then a brightness compensation gain $CompGain\_ALG1(i)$ needs to be set for the display data of each frame of image that is displayed next by the light emitting device 1 according to a plurality of comparison results indicating the difference.

In the embodiment of the present disclosure, the light emission luminance of the light emitting device to be compensated in the display panel 10 is sensed by the light sensing device 2, and the brightness compensation gain $CompGain\_ALG1(i)$ of the light emitting device 1 is set according to the sensing result, so as to effectively avoid the problem that the light emission luminance of the light emitting device 1 is decreased as the display time of the display panel increases.

In some embodiments, at the step S12 in the sensing stage, the step of setting the brightness compensation gain $CompGain\_ALG1(i)$ of the light emitting device 1 to be compensated may specifically include: obtaining, every predetermined period, an actual brightness value $GL(i)'$ of the light emitting device to be compensated during display of at least one frame of image; and setting a brightness compensation gain $CompGain\_ALG1(i)$ of the light emitting device to be compensated according to the obtained actual brightness value $GL(i)'$ and the target brightness value $GL(i)$.

Specifically, the actual brightness value $GL(i)'$ of the light emitting device to be compensated during the display of at least one frame of image is obtained after the display panel 10 performs display for a certain period of time, for example, 30 hours, and the brightness compensation gain CompGain_ALG1($i$) of the light emitting device to be compensated is set according to the obtained actual brightness value GL(i)' and the target brightness value GL(i). In short, the display panel 10 sets the brightness compensation gain CompGain_ALG1($i$) of the light emitting device to be compensated every 30 hours of display. In this way, there is no need to perform sensing every time when each frame of image is displayed, which can save power consumption while reducing the amount of calculation.

In some embodiments, at the step S12 in the sensing stage, the step of setting the brightness compensation gain CompGain_ALG1($i$) of the light emitting device 1 to be compensated may specifically include: obtaining, every predetermined period, a plurality of actual brightness values GL(i)' of the light emitting device to be compensated during continuous display of a plurality of frames of images, comparing an average value of the actual brightness values GL(i)' with an average value of a plurality of target brightness values GL(i) corresponding to the actual brightness values GL(i)', and setting a brightness compensation gain CompGain_ALG1($i$) of the light emitting device to be compensated according to the comparison result.

Specifically, after the display panel 10 performs display for a certain period of time, for example, 30 hours, the light emission luminance of each light emitting device to be compensated may be sensed in the transition region of the plurality of frames of images that are continuously displayed, that is, the light emission luminance of each light emitting device to be compensated is sensed once in each transition region. The number of a plurality of actual brightness values GL(i)' of each light emitting device to be compensated is determined according to the sensing times. If the same test data is written in the light emitting device to be compensated in each sensing stage, the target brightness values GL(i) corresponding to the multi sensings are the same, and the average value of the target brightness values GL(i) is one target brightness value GL(i). At this time, it is only necessary to average the actual brightness values GL(i)' sensed each time, determine whether there is a difference between the average value of the actual brightness values GL(i)' and the target brightness values GL(i), and set the brightness compensation gain CompGain_ALG1($i$) of the light emitting device to be compensated according to the determination result. Of course, the brightness compensation gain CompGain_ALG1($i$) of the light emitting device to be compensated may also be set according to the number of the light emitting device of which a difference between the actual brightness value GL(i)' and the target brightness value GL(i) exists.

In some embodiments, the step S12 of setting the brightness compensation gain CompGain_ALG1($i$) of the light emitting device to be compensated according to the obtained actual luminance value GL(i)' and the target luminance value GL(i) includes:
  comparing the actual luminance value GL(i)' of the light emitting device to be compensated with the target luminance value GL(i), and determining whether the brightness compensation gain CompGain_ALG1($i$) of the light emitting device to be compensated needs to be adjusted according to the comparison result;
  when it is determined that the brightness compensation gain CompGain_ALG1($i$) of the light emitting device to be compensated needs to be adjusted, performing the adjustment according to the correspondence relationship between the brightness value range and the adjustment range of the brightness compensation gain CompGain_ALG1($i$).

In some embodiments, before the step of obtaining the actual luminance value GL(i)' of the light emitting device to be compensated according to the sensing data generated by the light sensing device, and setting the brightness compensation gain CompGain_ALG1($i$) of the light emitting device to be compensated according to at least the obtained actual luminance value GL(i)' and the target luminance value GL(i), the display method further includes determining the light emitting device to be compensated according to the target brightness value GL(i) of each light emitting device 1 when a plurality of frames of images are displayed in predetermined period of time.

For example, if the target brightness value GL(i) of a certain light emitting device 1 is always high for the display of a plurality of frames of images within a predetermined period of time, it may be determined that the loss of the light emitting device 1 is relatively large, and the deterioration degree is relatively great, and thus the light emitting device 1 is determined to be the light emitting device to be compensated.

In some embodiments, the step of determining the light emitting device to be compensated according to the target brightness value GL(i) of each light emitting device 1 for the display of a plurality of frames of images within the predetermined period of time includes the following steps:
  determining the light emitting device 1, of which the target brightness values GL(i) for a plurality of frames of images displayed within the predetermined period of time meets a predetermined standard, to be the light emitting device to be compensated, where the predetermined standard includes at least one of the following conditions:
  the target brightness values GL(i) of the light emitting device for the plurality of frames of images displayed within the predetermined period of time exceed a predetermined value;
  among the plurality of frames of images displayed within the predetermined period of time, a ratio of frames of images for which the target brightness value GL(i) exceeds the predetermined value is greater than a predetermined ratio; and
  the average value of the target luminance values GL(i) for the plurality of frames of images displayed within the predetermined period of time exceeds the predetermined value.

The predetermined value is a preset parameter in the embodiment of the present disclosure, and may be specifically set according to parameters such as power of the light emitting device and the like.

In some embodiments, the display panel 10 is divided into a plurality of test regions. The step of determining the light emitting device to be compensated according to the target brightness values GL(i) of the light emitting devices for the plurality of frames of images displayed within the predetermined period of time further includes: determining a to-be-compensated test region according to a target brightness value GL(i) of each light emitting device for the plurality of frames of images displayed within the predetermined period of time, and determining each light emitting device in the to-be-compensated test region to be the light emitting device to be compensated.

For example, according to target brightness values GL(i) of each light emitting device 1 for the plurality of frames of images displayed within the predetermined period of time, the sum of the target brightness values GL(i) of all the light emitting devices 1 in each test region is obtained, the test region in which the sum of the target brightness values GL(i) is greater than a predetermined value—is regarded as the to-be-compensated test region, and then all the light emitting devices 1 in the to-be-compensated test region to be compensated are regarded as light emitting devices to be compensated.

Figure 8:
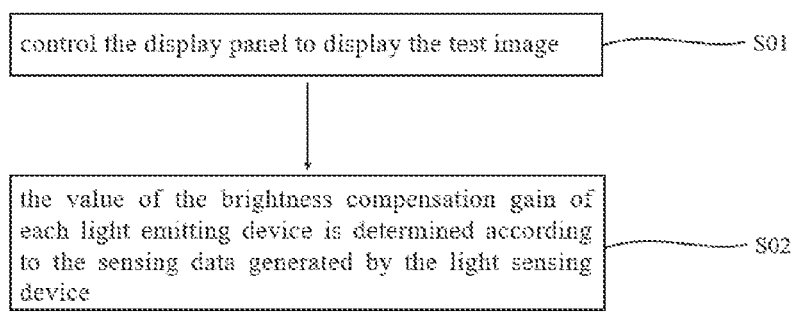
FIG. 8 is a flowchart of a display method of a display panel in a startup stage according to an embodiment of the disclosure.

In some embodiments, FIG. 8 is a flowchart of a display method of the display panel 10 in startup stage according to the embodiment of the disclosure. As shown in FIG. 8, the display method according to the embodiment of the present disclosure further includes the following steps S01 and S02 in the startup stage.

At step S01, the display panel 10 is controlled to display the test image.

At step S02, the value of the brightness compensation gain CompGain_ALG1(i) of each light emitting device 1 is determined according to the sensing data generated by the light sensing device, where the brightness compensation gain CompGain_ALG1(i) is the brightness compensation gain CompGain_ALG1(i) of each light emitting device 1 during normal display after the startup.

That is, before the display panel 10 enters the normal display state, the light emission luminance of each light emitting device 1 is sensed to determine the brightness compensation gain CompGain_ALG1(i) of each light emitting device 1, and the brightness compensation gain CompGain_ALG1(i) is the brightness compensation gain CompGain_ALG1(i) of each light emitting device 1 during the normal display after the startup. The controller may provide display data for a certain period of time to each light emitting device 1 with the brightness compensation gain CompGain_ALG1(i).

In addition, the light emitting devices to be compensated in the embodiment of the present disclosure may be all the light emitting devices 1 in the display panel 10, and in this case, the step of determining the light emitting devices to be compensated may be omitted.

In some embodiments, the step of controlling the display panel 10 to display the test image in the step S01 during the startup stage includes the following steps:

inputting the same test data to each light emitting device 1 in the display panel 10 to control the display panel 10 to display a test image, or inputting the same test data to some of the light emitting devices 1 in the display panel 10 to control the display panel 10 to display the test image.

In this step, when test data is input to some of the light emitting devices 1 in the display panel 10, the test data may be written to the light emitting devices 1 every other row or column, so that the setting of the brightness compensation gain CompGain_ALG1(i) of all the light emitting devices 1 may be completed through two frames of test images.

Before the display panel 10 is started up and enters normal display state, the display method according to the embodiment of the disclosure further includes a light sensing device calibration stage, in which the light sensing device is calibrated. Specifically, the light sensing device can be irradiated by the test light source, and the sensing calibration gain of the light sensing device is determined according to the sensing data generated by the light sensing device under the test light source.

That is, in this step, whether there is a deviation in the sensing result of the sensing light sensing device in the display panel 10 is determined by irradiating the light sensing device through the test light source. If there is a deviation, the sensing calibration gain of the light sensing device is determined, so that when the sensing result of the light sensing device 2 is read in the sensing stage, the sensing result of the light sensing device 2 is calibrated according to the sensing calibration gain, so as to avoid misjudgment of deterioration of the light emitting device 1 due to the deviation in the sensing result of the light sensing device 2.

In some embodiments, the sensing calibration gain of the light sensing device may be obtained in following two manners.

Figure 9:
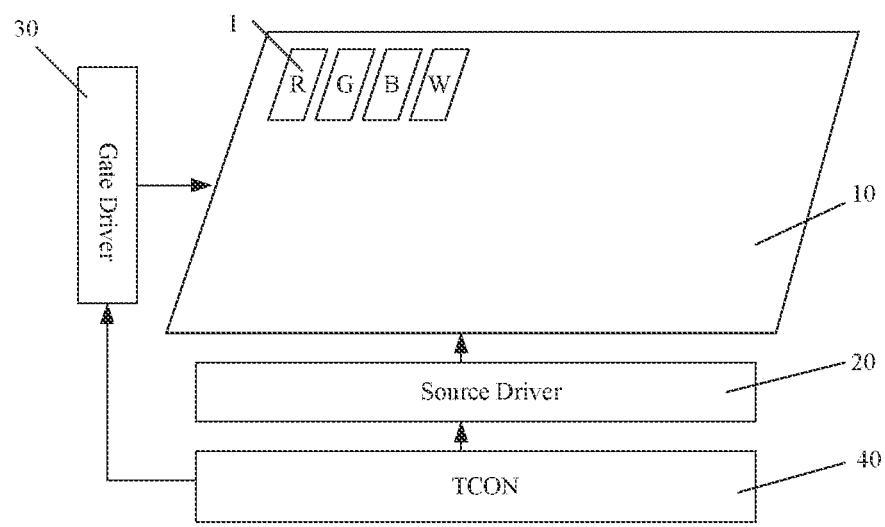
FIG. 9 illustrates a display panel after external compensation.

The first manner is as follows. FIG. 9 illustrates an externally compensated display panel. As shown in FIG. 9, the externally compensated display panel is used as a test light source, and the display brightness of each light emitting device 1 in the compensated display panel is uniform. The display data is provided to the source driver 20 through the timing controller 40, and the source driver 20 converts the display data into a voltage signal and controls the light emitting device 1 in the display panel 10 to display. At this time, since the display panel 10 is a compensated display panel, the light emission luminance of the light emitting device 1 is uniform. The light sensing device 2 may perform optical collection on the light emitting device 1 through irradiating the light sensing device 2 by the light emitting device 1, and because the display of the display panel 10 is a uniform light source, the light sensing device that collects different data among the light sensing devices 2 may be classified into difference light sensing devices.

This method may specifically include: inputting the same test data to each light emitting device 1 in the display panel 10, obtaining the brightness value of each light emitting device 1 in the display panel 10 through a brightness acquisition element, compensating the light emitting devices 1 according to the obtained result, and using the compensated display panel 10 as a test light source.

The light sensing device 2 is irradiated by a test light source, and a sensing calibration gain of the light sensing device 2 is obtained according to sensing data generated by the light sensing device 2.

The brightness acquisition element may be an optical lens (CCD) or a brightness measuring instrument (Luminance meter). The following description will be made by taking an example in which the light emission luminance of the display panel 10 is compensated with the optical lens.

Specifically, the whole OLED panel is photographed by using an optical lens to obtain the brightness value of each pixel under several characteristic gray scales, and then modeling is performed on the sub-pixels to obtain a gray scale-versus-brightness characteristic curve of each pixel. When a certain display image is compensated, according to the target brightness corresponding to the input gray scale, the corresponding compensation gray scale that makes the sub-pixel reaches the same brightness can be reversely deduced from the gray scale-versus-brightness characteristic curve of the sub-pixel. Such operation is performed on all the sub-pixels, so that a so-called compensation image can be obtained, and the backboard is driven with the compensation image such that the target brightness value may be obtained.

Figure 10:
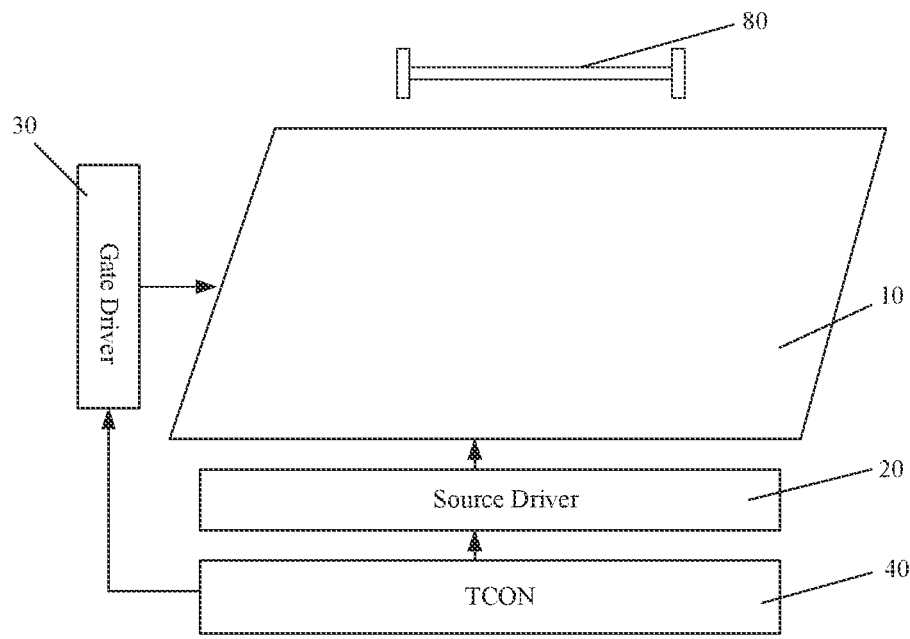
FIG. 10 illustrates a display panel using an external light source as a test light source.

The second manner is as follows. FIG. 10 illustrates a display panel using an external light source as a test light source. As shown in FIG. 10, a uniform external light source 80 is used as a test light source. An optical integrating sphere and an LED backlight light source are common uniform light sources and may be used as a test light source. When the display panel 10 is not lightened, the light sensing device 2 is irradiated by the external light source 80, and performs optical collection, and since light of the external light source 80 is uniform, the light sensing device that collects different data among the light sensing devices 2 may be classified into different light sensing devices.

In some embodiments, the following is a method of determining the sensing calibration gain value for each light sensing device 2.

Specifically, the sensing calibration gain value of each light sensing device 2 may be calculated and determined in the following manner.

First, obtaining a sensing calibration comparison parameter StandardData, which specifically includes the following three manners.

In Manner 1, an average value SenseData(AVG) of the sensing data of all the light sensing devices 2 is used as the comparison parameter; that is, StandardData=SenseData(AVG)=$\Sigma_1^n$ SenseData(i)/$_n$.

In Manner 2, the maximum value SenseData(Max) among the sensing data of all the light sensing devices 2 is used as the sensing calibration comparison parameter StandardData; that is, StandardData=SenseData(Max).

In Manner 3, a calibration comparison parameter SenseData(User) sensed based on a value set according to the luminance value of the test light source is used as the sensing calibration comparison parameter StandardData; that is, StandardData=SenseData(User).

Next, the ratio of the sensing data SenseData(i) of each light sensing device 2 to the sensing calibration comparison parameter StandardData is used as the sensing calibration gain value CalibrationGain(i) of each light sensing device 2, that is, CalibrationGain(i)=SenseData(i)/StandardData.

It should be noted that, the sensing result SenseData' output by each light sensing device 2 is determined based on the sensing calibration gain value CalibrationGain(i) and the sensing result SenseData, that is, SenseData'=CalibrationGain(i)×SenseData×α, where α is a constant modification term, and equal to 1 if the display panel 10 is not adjusted. In addition, the deterioration period of the light sensing device 2 is much longer than that of the light emitting device 1, so that the deterioration of the light sensing device 2 can be ignored in normal display state.

In order to make the specific method according to the embodiments of the present disclosure more clear, a specific flow of a display method of a display panel is provided below.

Figure 11:
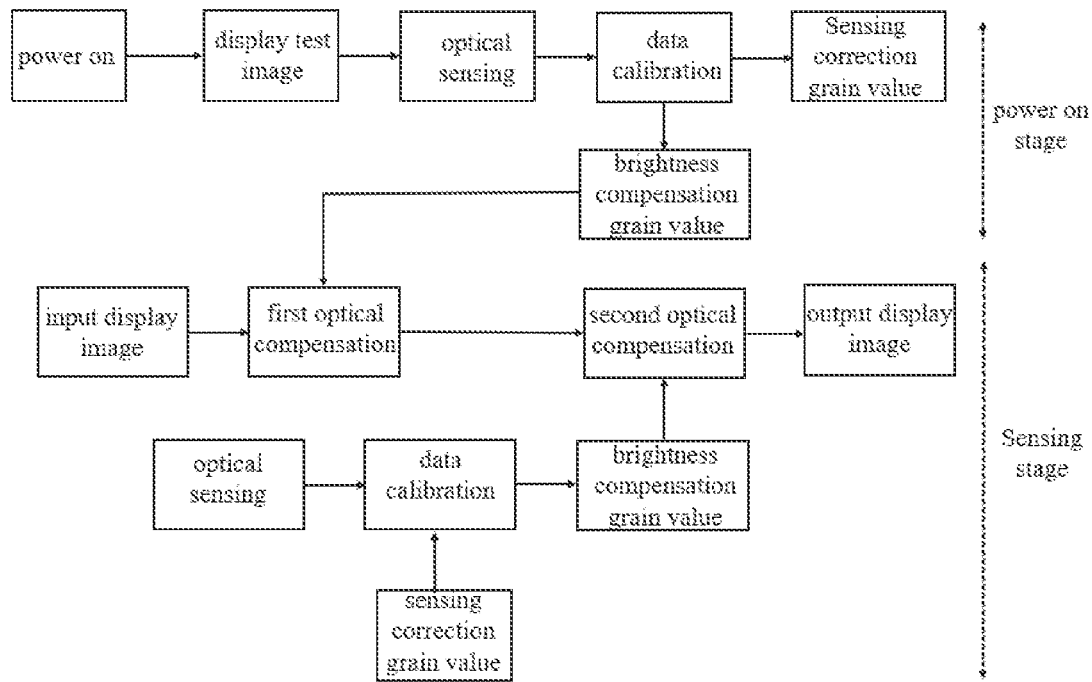
FIG. 11 is a flowchart of a display method according to an embodiment of the disclosure.

FIG. 11 is a flow chart of a display method according to an embodiment of the disclosure. As shown in FIG. 11, in the startup stage, first, the display panel 10 is started up and controlled to display images, the light sensing device perform optical sensing, and data calibration is performed on the sensed data and the sensing calibration gain value of the light sensing device according to the sensing to obtain an initial brightness compensation gain value of each light sensing device.

In the sensing stage, a first optical compensation is performed on the display image input based on the optical compensation parameters obtained in the startup stage, the sensing is performed according to the light sensing element, data calibration is performed on the sensing result of the light sensing element according to the sensing calibration gain value to obtain a brightness compensation gain value, a second optical compensation is performed according to the brightness compensation gain value to obtain the display data, and the display image is output according to the display data.

It should be rioted that the specific steps of the startup stage and the sensing stage are the same as the above steps, and therefore, the detailed description is omitted here, and of course, the process also includes the light sensing device calibration stage.

Figure 12:
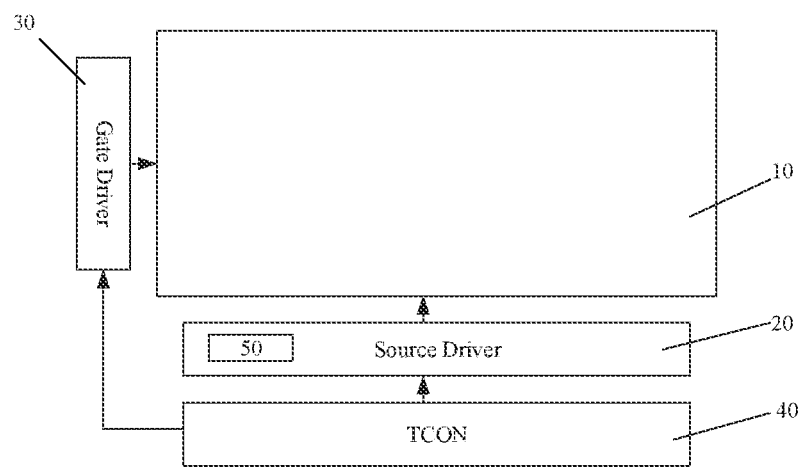
FIG. 12 is a schematic structural diagram of a display device according to an embodiment of the disclosure.

In a second aspect, FIG. 12 is a schematic diagram of a structure of a display device according to an embodiment of the disclosure. As shown in FIG. 12, an embodiment of the present disclosure provides a display device, including the display panel 10, one or more source drivers 20 (Source Driver), one or more gate drivers 30 (Gate Driver), a timing controller 40 (TCON), a memory and an optical compensation processor (50). The display panel 10 includes a plurality of pixel units 100 and a plurality of sensing units 102. Each of the pixel units 100 and the sensing units 102 has the same structure as the pixel unit 100 and the sensing unit 102 described above, and a description thereof will not be repeated. An optical compensation processor is electrically connected to the source driver, and is configured to, during a sensing stage, obtain an actual brightness value of the light emitting device to be compensated according to the sensing data generated by the light sensing device, to set a brightness compensation gain of the light emitting device to be compensated according to at least the obtained actual brightness value and a target brightness value, and to provide the brightness compensation gain to the source driver. The timing controller 40 is configured to control the source driver 20 to supply display data to the light emitting devices 1 in the display panel 10, and the gate driver 30 is configured to supply scan signals to the pixel driving circuit and the sensing circuit. It should be noted that an optical compensation processor, which is a subject of executing the display method according to an embodiment of the disclosure, may be integrated into, for example, a source driver (Source Driver), a timing controller (TCON), or a logic operation circuit for implementing at least part of the operation process, a processor provided in the display device, or a processor provided in an external device connected to the display device, but is not be limited thereto. The display device may be any product or component with a display function, e.g., a display panel, a mobile phone, a tablet computer, a television, a display, a notebook computer, a digital photo frame, a navigator or the like. The processor may be, for example, an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, a microprocessor, but is not be limited thereto. When the subject of executing the display method according to the embodiment includes a processor, a readable storage medium storing a program may be provided, so that the program is executed by the processor to implement the data compensation method according to the embodiment.

It will be understood by those of ordinary skill in the art that all or some of the steps of the methods, functional modules/units in systems and devices disclosed above may be implemented as software, firmware, hardware, or suitable combinations thereof. In a hardware implementation, the division between functional modules/units mentioned in the above description does not necessarily correspond to the division of physical components. For example, one physical component may have a plurality of functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on computer readable media, which may include computer storage media (or non-transitory media) and communication media (or transitory media). The term "computer storage media" includes volatile and nonvolatile, removable and non-removable media implemented in any method or technology for storing information such as computer readable instructions, data structures, program modules or other data, as is well known to those skilled in the art. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by a computer. In addition, it is well known to those of ordinary skill in the art that communication media typically includes computer readable instructions, data structures, program modules or other data in a modulated data signal such as a carrier wave or other transport mechanism, and may include any information delivery media.

Example embodiments have been disclosed herein, and although specific terms are employed, they are used and should be interpreted in a generic and descriptive sense only and not for purposes of limitation. In some instances, it will be apparent to one skilled in the art that features, characteristics and/or elements described in connection with a particular embodiment may be used alone or in combination with features, characteristics and/or elements described in connection with other embodiments, unless expressly stated otherwise. Therefore, it will be understood by those skilled in the art that various changes in form and details may be made therein without departing from the scope of the disclosure as set forth in the appended claims.

What is claimed is:

1. A display method of a display panel, the display panel comprising light emitting devices and light sensing devices, each of light sensing devices being configured to sense light emitted by at least one of the light emitting devices, and display data of each light emitting device in the display panel being obtained according to a target brightness value and a brightness compensation gain value, the method comprising:

before a sensing stage, determining, among the light emitting devices, a light emitting device to be compensated, wherein for any light emitting device of the light emitting devices, in a plurality of frames of images displayed by the display panel in a predetermined period of time, a ratio of number of frames, in which the target brightness value of the light emitting device exceeds a threshold value, and a total number of frames of the plurality of frames of images, is greater than a predetermined ratio, the light emitting device is determined to be the light emitting device to be compensated; and in the sensing stage, obtaining, according to sensing data generated by the light sensing devices, an actual brightness value of the light emitting device to be compensated, and setting, according to at least the obtained actual brightness value and the target brightness value, a brightness compensation gain of the light emitting device to be compensated.

2. The display method according to claim 1, wherein the obtaining the actual brightness value of the light emitting device to be compensated according to the sensing data generated by the light sensing devices, and setting the brightness compensation gain of the light emitting device to be compensated according to at least the obtained actual brightness value and the target brightness value, comprises:

obtaining the actual brightness value of the light emitting device to be compensated for display of at least one frame of image every predetermined period, and setting the brightness compensation gain of the light emitting device to be compensated according to the obtained actual brightness value and the target brightness value.

3. The display method according to claim 2, wherein the obtaining the actual brightness value of the light emitting device to be compensated for the display of the at least one frame of image every predetermined period, and the setting the brightness compensation gain of the light emitting device to be compensated according to the obtained actual brightness value and the target brightness value, comprises:

obtaining, every predetermined period, a plurality of actual brightness values of the light emitting device to be compensated for a plurality of frames of images that are continuously displayed;

comparing an average value of the plurality of actual brightness values with an average value of a plurality of target brightness values corresponding to the plurality of actual brightness values; and setting the brightness compensation gain of the light emitting device to be compensated according to a result of the comparing.

4. The display method according to claim 1, wherein the display panel is divided into a plurality of test regions, the determining the light emitting device to be compensated according to the target brightness value of each light emitting device for the plurality of frames of images within the predetermined period of time comprises:

determining a test region to be compensated according to the target brightness value of each light emitting device for the plurality of frames of images displayed within the predetermined period of time; and determining each light emitting device in the test region to be compensated as the light emitting device to be compensated.

5. The display method according to claim 1, wherein the method further comprises:

in a startup stage, controlling the display panel to display a test image, and determining the brightness compensation gain of each light emitting device according to the sensing data generated by the light sensing devices.

6. The display method according to claim 5, wherein the controlling the display panel to display the test image comprises:

inputting a same test data to each light emitting device in the display panel to control the display panel to display the test image; or inputting a same test data to a part of light emitting devices in the display panel to control the display panel to display the test image.

7. The display method according to claim 6, wherein the part of light emitting devices to which the same test data is input are arranged every other row or column.

8. The display method according to claim 1, wherein the setting the brightness compensation gain of the light emitting device to be compensated according to the obtained actual luminance value and the target luminance value comprises:

comparing the actual brightness value of the light emitting device to be compensated with the target brightness value; and determining whether the brightness compensation gain of the light emitting device to be compensated needs to be adjusted; and adjusting the brightness compensation gain according to a correspondence relation between a brightness value range and a brightness compensation gain adjustment range when it is determined that the brightness compensation gain of the light emitting device to be compensated needs to be adjusted.

9. The display method according to claim 1, further comprising:

in a light sensing device calibration stage, irradiating the light sensing device by a test light source, and obtaining a sensing calibration gain of the light sensing device according to the sensing data generated by the light sensing devices.

10. The display method according to claim 9, wherein the irradiating the light sensing device by the test light source and obtaining the sensing calibration gain of the light sensing device according to the sensing data generated by the light sensing device comprises:

inputting a same test data to each light emitting device in the display panel;

obtaining a brightness value of each light emitting device in the display panel through a brightness acquisition element;

compensating the light emitting devices according to the obtained result, and using the compensated display panel as the test light source; and irradiating the light sensing device by the test light source, and obtaining the sensing calibration gain of the light sensing device according to the sensing data generated by the light sensing device.

11. The display method according to claim 9, wherein irradiating the light sensing device by the test light source and obtaining the sensing calibration gain of the light sensing device according to the sensing data generated by the light sensing device comprises:

irradiating the light sensing device by using an optical integrating sphere or a backlight light source as the test light source; and obtaining the sensing calibration gain of the light sensing device according to the sensing data generated by the light sensing device.

12. The display method according to claim 9, wherein the obtaining the sensing calibration gain of the light sensing device according to the sensing data generated by the light sensing device comprises:

obtaining sensing calibration comparison parameters, and determining a ratio of the sensing data of each light sensing device to the sensing calibration comparison parameters as the sensing calibration gain of each light sensing device, wherein the sensing calibration comparison parameter is obtained by any one of:

determining an average value of the sensing data of all the light sensing devices as the sensing calibration comparison parameter;

determining a maximum value of the sensing data of all the light sensing devices as the sensing calibration comparison parameter; and setting the sensing calibration comparison parameter according to a brightness value of the test light source.

13. A display device, comprising:

a display panel comprising a plurality of pixel units and a plurality of sensing units, each of the plurality of pixel units comprising a pixel driving circuit and a light emitting device, each of the plurality of sensing units comprising a sensing circuit comprising a light sensing device, and each of light sensing device being configured to sense brightness of at least one of the light emitting devices;

one or more source drivers electrically connected to the plurality of pixel units and configured to provide display data to the plurality of pixel units; and optical compensation processor electrically connected to the one or more source driver, and configured to, before a sensing stage, determine, among the light emitting devices, a light emitting device to be compensated, wherein for any light emitting device of the light emitting devices, in a plurality of frames of images displayed by the display panel in a predetermined period of time, a ratio of number of frames, in which the target brightness value of the light emitting device exceeds a threshold value, and a total number of frames of the plurality of frames of images, is greater than a predetermined ratio, the light emitting device is determined to be the light emitting device to be compensated;

and during the sensing stage, obtain an actual brightness value of the light emitting device to be compensated according to a sensing data generated by the light sensing device, set a brightness compensation gain of the light emitting device to be compensated according to at least the obtained actual brightness value and the target brightness value, and provide the brightness compensation gain to the one or more source driver.

* * * * *